Patented Jan. 15, 1946

2,393,157

UNITED STATES PATENT OFFICE 2,393,157

PROCESS FOR PROMOTING THE EMULSION POLYMERIZATION OF CONJUGATED DI-OLEFINS

Anthony H. Gleason, Westfield, and William J. Sparks, Elizabeth, N. J., assignors, by mesne assignments, to Jasco, Incorporated, a corporation of Louisiana No Drawing. Application September 19, 1941, Serial No. 411,490

8 Claims. (Cl. 260—84.5)

This invention relates to the polymerization of unsaturated organic compounds; relates particularly to the production of resinous and rubberlike products by polymerization of olefinic materials, such as diolefins, vinyl benzenes, acrylonitriles, vinyl ketones, acrylate esters, and similar unsaturates; and relates especially to accelerators or promoters for improving the speed of polymerization and modifying the physical characteristics of the polymerizate; especially of interpolymers of a diolefin such as butadiene with other polymerizable substances.

In the prior art of the production of olefinic polymerizates, it has been customary to polymerize diolefins such as butadiene, either alone or in an interpolymerization reaction with other polymerizable substances such as styrene or its homologs, the acrylonitriles, the unsaturated ketones, the acrylate esters and similar unsaturates, by preparing them in the form of an aqueous dispersion or emulsion in water, maintained by the presence of emulsifying agents and polymerized by the presence of oxygen liberating compounds. Attempts have been made to promote and accelerate the polymerization reaction and to obtain more plastic products by the presence in the polymerization mixture of halogenated compounds such as carbon tetrachloride; also various organic compounds such as xanthogen polysulfides, thioacids, mercapto compounds, and various nitro and amino compounds have been used as promoters.

The present invention provides a new and useful promoter in the form of carbon disulfide as an addition agent to the polymerization mixture. The effect of the carbon disulfide is to increase the speed of the polymerization reaction. The carbon disulfide is particularly advantageous because of its low cost. The promoting and plasticizing effect also can be markedly influenced by utilizing carbon disulfide in combination with the previously used mercaptans and halides to give a still more satisfactory reaction rate and improved plasticity in the product.

An object of the present invention is to increase the rate of polymerization of a diolefin or of a mixture of a diolefin with another polymerizable organic compound; and to improve the placticity of the resulting polymer; a further object is to promote the polymerization reaction by the presence of an inexpensive promoter in the form of carbon disulfide, either alone or in admixture with other promoters; and to polymerize the unsaturated materials into polymers having the desired property of good plasticity and capable of reacting with sulfur to give vulcanizates of good tensile and of high resilience; and, in addition, to polymerize mono-olefinic material such as styrene or its homologs while in emulsion form. Other objects and details of the invention will be apparent from the following description.

In the prior art it has been customary to polymerize the olefins particularly the diolefins such as butadiene, either alone or in admixture, with other olefinic material or other unsaturates, by preparing a mixture of the unsaturates in convenient proportions, usually either the diolefin alone or the diolefin with another unsaturate in which the diolefin is present in the proportion of more than 40 to 50%. The olefinic material is then emulsified in water with the aid of an appropriate soap or other emulsifier such as sodium stearate, sodium isopropyl napthalene sulfonate, cation active emulsifiers and the like, either singly or in various mixtures. The polymerization catalyst usually takes the form of an oxygen providing substance, preferably a peroxide such as hydrogen peroxide or sodium perborate or potassium persulfate or the like. This mixture is then preferably maintained at a temperature between 25° C. and about 65° C. for a time interval ranging from 4 or 5 hours to 25 to 30 hours; preferably not more than about 20 hours, while the polymerization reaction occurs. When a sufficient yield has been obtained, usually from 65 to 85% of the original content of unsaturates, the emulsion is freed from part or all of the monomers, and the emulsion coagulated by the application of a suitable coagulant such as a brine solution. The coagulate is then washed, dried, and compounded with various substances and vulcanized.

In practicing the present invention a substantial proportion of carbon disulfide is added to the polymeriation mixture and retained in the mixture during the polymerizing reaction. The carbon disulfide is removed, in part at least, with the unpolymerized unsaturates in the emulsion at the end of the polymerization period. The presence of the carbon disulfide is found to increase the speed of polymerization very markedly to permit of the carrying of the reaction to a much higher yield in a shorter time than is otherwise possible. Also, the presence of the carbon disulfide increases the plasticity of the finished polymer. The carbon disulfide is particularly effective in the polymerization of a diolefin such as butadiene, either alone or in admixture with such unsaturates such as styrene, acrylonitrile, ethyl cinnamate, methacrylic esters, fumaric esters, vinyl ketones and the like. The desirable amount of carbon disulfide present in the reaction mixture may range from 0.5% to 75% of the amount of olefinic reactants. A desirable olefin for use in connection with this promoter may be found in butadiene or isoprene or piperylene; or dimethyl-butadiene or other polyolefins which are capable of polymeriation or of interpolymerization with other polymerizable substances.

EXAMPLE 1

Fifteen parts of butadiene and 5.6 parts of acrylonitrile were emulsified in 45 parts of water, having dissolved therein 5 parts of a 2.8 solution of potassium persulfate and approximately 1.2 parts of sodium oleate. To this mixture there was added 1 part of carbon disulfide. The emulsion of these various materials was maintained in a pressure vessel by rapid stirring over a time interval of 16 hours, and the temperature was held at 35° C. At the end of this time interval, a latex-like emulsion was obtained. This emulsion was coagulated by the addition of approximately an equal volume of saturated brine. The resulting coagulum amounted to 81% of the original unsaturates. The coagulum was washed with water and dried by milling on a warm roll mill to yield an elastic, somewhat plastic material, which when compounded with sulfur and the usual compounding ingredients vulcanized into a good, resilient, rubber-like substance.

Similar experiments, #2 to 7 inclusive, were conducted in the same way, with varying proportions of the various constituents, as shown in Table I.

in combination, to modify the properties of the copolymer to yield both a more rapid rate of polymerization and to yield a more plastic polymerizate capable of easy working on a rubber mill.

EXAMPLE 8

Example 7 was repeated with the exception that instead of using 15 cc. of carbon disulfide a similar quantity of carbon tetrachloride was substituted therefor. The yield of the resulting polymer was 26% in 16 hours. This quantity of carbon tetrachloride results in a low yield, which is apparently due to the dilution effect. The same dilution is present when carbon disulfide is employed but owing to its strong promoting action the yield is not diminished but somewhat increased.

The reaction is not limited to butadiene-acrylonitrile mixtures, but is equally applicable to other known combinations for preparing synthetic rubber such as butadiene-styrene and isoprene-styrene.

Examples 9 and 10, conducted like Example 1, show the improvement obtainable by the presence of carbon disulfide in the interpolymerization of styrene and isoprene.

*Table II*

| Example | Reactant, styrene | Co-reactant, isoprene | Carbon disulfide | Mercaptan | Time, hours | Temp., °C. | Percent yield |
|---|---|---|---|---|---|---|---|
| | Grams | Grams | | | | | |
| 9 | 90.0 | 30.0 | None | None | 16 | 55 | Approx. 30 |
| 10 | 90.0 | 30.0 | 30 cc | ...do | 16 | 55 | 91 |

The promoting effect is similarly effective in the presence of octyl mercaptans, as is shown in Examples 11 and 12 in Table III.

*Table III*

| Example | Reactant, butadiene | Co-reactant, acrylonitrile | Carbon disulfide | Mercaptan | Time, hours | Temp., °C. | Percent yield |
|---|---|---|---|---|---|---|---|
| | Grams | Grams | | | | | |
| 11 | 15.0 | 5.6 | None | 0.1 cc. octyl | 20 | 30-35 | 63 |
| 12 | 15.0 | 5.6 | 0.25 | ...do | 20 | 30-35 | 81 |

These examples show that the polymerization reaction of a diolefin alone or the interpolymerization reaction of a diolefin with another polymerizable organic compound, as above pointed out, can be markedly speeded up and promoted to give desirable yields of the polymerizate while reducing the time interval by the addition of carbon disulfide in quantities ranging from about 1% to 75%. When a modified type interpolymer is desired, having plastic properties, and capable of easy milling and processing, the incorporation of aromatic mercaptans, mercapto-carboxylic acids and aliphatic mercaptans and xanthogenates or mixtures thereof may be used in concentrations as little as 0.01% to as high as about 4.0% to impart to the interpolymer the desired plasticity and other properties suitable for milling

*Table I*

| Example | Reactant, butadiene | Co-reactant, acrylonitrile | Carbon disulfide | Mercaptan | Time, hours | Temp., °C. | Percent yield |
|---|---|---|---|---|---|---|---|
| | Grams | Grams | | | | | |
| 2 | 15.0 | 5.6 | None | None | 16 | 40 | 0 |
| 3 | 15.0 | 2.5 | 1.0 cc | ...do | 17 | 40 | 60 |
| 4 | 15.0 | 5.6 | 1.0 cc | ...do | 17 | 40 | 92 |
| 5 | 15.0 | 5.6 | None | 0.4 cc. benzyl | 17 | 40 | 25 |
| 6 | 15.0 | 5.6 | 1.0 cc | ...do | 17 | 40 | 55 |
| 7 | 15.0 | 5.6 | 15.0 cc | ...do | 16 | 40 | 87 |

These examples show the promotion of the polymerization reaction for mixtures of butadiene with acrylonitrile in the presence of various concentrations of carbon disulfide, both in the absence of mercapto-type compounds and in the presence of mercapto-type compounds such as benzyl mercaptan, as shown. In all of these examples the same emulsifier and catalysts were employed, as in Example 1. These examples show that carbon disulfide is an effective polymerization promoter for the preparation of rubber-like materials of the "Buna" type.

These experiments have also shown that carbon disulfide is effective with benzyl mercaptan, and other processing operations. The effect of carbon disulfide in suitable concentrations is most pronounced at polymerization temperature of 25°–60° C.

The carbon disulfide composition of the invention is not limited to the use of any particular emulsifying agent, to any particular catalyst, nor to any particular modifier, but as far as is now known, any emulsifying agent which is useful for the reaction alone is useful with the promoter of the invention. Likewise, any useful catalyst or any useful modifier is similarly usable with the present promoter.

The relative quantities referred to, the additions and methods for effecting the same, as well as the temperatures of polymerization can be varied within wide limits. It will be readily understood, that the invention is not restricted by the above examples which are only intended to show how the invention can be carried into effect. Instead of polymerizing a diolefinic compound or mixtures thereof, various combinations such as a diolefinic compound with an alkyl substituted styrene or homologs thereof with an unsaturated ester such as dodecycl methacrylate, polymerizable esters of cinnamic, fumaric, acrylic acids, etc., can be copolymerized to give polymerizates of technically valuable properties ranging from plastic, elastic materials to hard, tough and thermoplastic resins, depending, of course, upon the concentration of reactant or reactants; which can be varied within wide limits.

The present invention, therefore, provides a method for promoting the polymerization reaction of a diolefinic compound with other polymerizable compounds by which stable polymers or resins are formed rapidly in one step in a high yield without the need of exercising control over the proportions of the promoter used. It will further be seen that the process presents an improvement over previous inventions in this field.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. In the process of producing emulsion polymerizates which consists of emulsifying in water an unsaturated organic compound selected from the group consisting of conjugated aliphatic diolefin hydrocarbons and mixtures of conjugated aliphatic diolefin hydrocarbons with compounds copolymerizable with said conjugated diolefins under the conditions of the reaction containing a single C=C linkage per molecule in the presence of an oxygen providing polymerization catalyst and an emulsifier, the improvement which consists of promoting the polymerization reaction by the addition of a member of the group consisting of carbon disulfide, mixtures of carbon disulfide with benzyl mercaptan and mixtures of carbon disulphide with octyl mercaptan.

2. In the process of producing emulsion polymerizates which consists of emulsifying in water an unsaturated organic compound selected from the group consisting of conjugated aliphatic diolefin hydrocarbons and mixtures of conjugated aliphatic diolefin hydrocarbons with compounds copolymerizable with said conjugated diolefins under the conditions of the reaction containing a single C=C linkage per molecule in the presence of an oxygen providing polymerization catalyst and an emulsifier, the improvement which consists of promoting the polymerization reaction by the addition of a member of the group consisting of carbon disulfide, mixtures of carbon disulfide with benzyl mercaptan and mixtures of carbon disulphide with octyl mercaptan, the amount of carbon disulfide present ranging from 0.5 to 75% of the amount of the unsaturated organic reactants.

3. In the process of producing emulsion polymerizates which consists of emulsifying in water a mixture of butadiene with a styrene in the presence of an oxygen providing polymerization catalyst and an emulsifier, the improvement which consists of promoting the polymerization reaction by the addition of a member of the group consisting of carbon disulfide, mixtures of carbon disulfide with benzyl mercaptan and mixtures of carbon disulphide with octyl mercaptan, the amount of carbon disulfide present ranging from 0.5 to 75% of the amount of the butadiene and the styrene in the reaction mixture.

4. In the process of producing emulsion polymerizates which consists of emulsifying in water a mixture of isoprene with a styrene in the presence of an oxygen providing polymerization catalyst and an emulsifier, the improvement which consists of promoting the polymerization reaction by the addition of a member of the group consisting of carbon disulfide, mixtures of carbon disulfide with benzyl mercaptan and mixtures of carbon disulphide with octyl mercaptan, the amount of carbon disulfide present ranging from 0.5 to 75% of the amount of the isoprene and styrene in the reaction mixture.

5. In the process of producing emulsion polymerizates which consists of emulsifying in water a mixture of butadiene with acrylonitrile in the presence of an oxygen providing polymerization catalyst and an emulsifier, the improvement which consists of promoting the polymerization reaction by the addition of a member of the group consisting of carbon disulfide, mixtures of carbon disulfide with benzyl mercaptan and mixtures of carbon disulphide with octyl mercaptan, the amount of carbon disulfide present ranging from 0.5 to 75% of the amount of the butadiene and acrylonitrile in the reaction mixture.

6. In the process of producing emulsion polymerizates which consists of emulsifying in water an unsaturated organic compound selected from the group consisting of conjugated aliphatic diolefin hydrocarbons and mixtures of conjugated aliphatic diolefin hydrocarbons with compounds copolymerizable with said conjugated diolefins under the conditions of the reaction containing a single C=C linkage per molecule in the presence of an oxygen providing polymerization catalyst and an emulsifier, the improvement which consists of promoting the polymerization reaction by the addition of from 0.5 to 75% of the amount of the unsaturated organic reactants of carbon disulfide.

7. In the process of producing emulsion polymerizates which consists of emulsifying in water an unsaturated organic compound selected from the group consisting of conjugated aliphatic diolefin hydrocarbons and mixtures of conjugated aliphatic diolefin hydrocarbons with compounds copolymerizable with said conjugated diolefins under the conditions of the reaction containing a single C=C linkage per molecule in the presence of an oxygen providing polymerization catalyst and an emulsifier, the improvement which consists of promoting the polymerization reaction by the addition of from 0.5 to 75% of the amount of the unsaturated organic reactants of carbon disulfide and benzyl mercaptan.

8. In the process of producing emulsion polymerizates which consists of emulsifying in water an unsaturated organic compound selected from the group consisting of conjugated aliphatic diolefin hydrocarbons and mixtures of conjugated aliphatic diolefin hydrocarbons with compounds copolymerizable with said conjugated diolefins under the conditions of the reaction containing a single C=C linkage per molecule in the presence of an oxygen providing polymerization catalyst and an emulsifier, the improvement which consists of promoting the polymerization reaction by the addition of from 0.5 to 75% of the amount of the unsaturated organic reactants of carbon disulfide and octyl mercaptan.

ANTHONY H. GLEASON.
WILLIAM J. SPARKS.